(12) United States Patent
Stravers et al.

(10) Patent No.: US 8,607,026 B2
(45) Date of Patent: Dec. 10, 2013

(54) TRANSLATION LOOKASIDE BUFFER

(75) Inventors: Paulus Stravers, Sunnyvale, CA (US); Jan-Willem van de Waerdt, Sunnyvale, CA (US)

(73) Assignee: Nytell Software LLC, Wilmington, DE (US)

( * ) Notice: Subject to any disclaimer, the term of this patent is extended or adjusted under 35 U.S.C. 154(b) by 0 days.

(21) Appl. No.: 13/298,800

(22) Filed: Nov. 17, 2011

(65) Prior Publication Data

US 2012/0066475 A1 Mar. 15, 2012

Related U.S. Application Data

(63) Continuation of application No. 10/242,785, filed on Sep. 13, 2002.

(51) Int. Cl.
*G06F 12/00* (2006.01)
*G06F 13/00* (2006.01)
*G06F 13/28* (2006.01)

(52) U.S. Cl.
USPC ........... 711/207; 711/205; 711/206; 711/208; 711/216; 711/221

(58) Field of Classification Search
None
See application file for complete search history.

(56) References Cited

U.S. PATENT DOCUMENTS

| | | | |
|---|---|---|---|
| 4,170,039 A | 10/1979 | Beacom et al. | |
| 4,215,402 A | 7/1980 | Mitchell et al. | |
| 4,638,426 A | 1/1987 | Chang et al. | |
| 4,680,700 A | 7/1987 | Hester et al. | |
| 5,136,702 A | 8/1992 | Shibata | |
| 5,526,504 A | 6/1996 | Hsu et al. | |
| 5,574,875 A | 11/1996 | Stansfield et al. | |
| 5,574,877 A | 11/1996 | Dixit et al. | |
| 5,752,275 A | 5/1998 | Hammond | |
| 5,860,147 A | 1/1999 | Doweck et al. | |
| 6,014,732 A | 1/2000 | Naffziger | |
| 6,026,476 A | 2/2000 | Rosen | |
| 6,205,531 B1 | 3/2001 | Hussain | |
| 6,212,603 B1 * | 4/2001 | McInerney et al. | ........... 711/125 |
| 6,233,652 B1 | 5/2001 | Mathews et al. | |
| 6,356,990 B1 * | 3/2002 | Aoki et al. | ..................... 711/205 |
| 6,360,220 B1 | 3/2002 | Forin | |

(Continued)

FOREIGN PATENT DOCUMENTS

WO 0150272 7/2001

OTHER PUBLICATIONS

Yamagata, et al., "A 288-kb Fully Parallel Content Addressable Memory Using a Stacked-Capacitor Cell Structure", IEEE Journal of Solid-State Circuits, vol. 27, No. 12, p. 1927-1933, Dec. 1992.

(Continued)

*Primary Examiner* — Yaima Rigol
(74) *Attorney, Agent, or Firm* — McAndrews, Held & Malloy, Ltd.

(57) ABSTRACT

A translation lookaside buffer (TLB) is disclosed formed using RAM and synthesisable logic circuits. The TLB provides logic within the synthesisable logic for pairing down a number of memory locations that must be searched to find a translation to a physical address from a received virtual address. The logic provides a hashing circuit for hashing the received virtual address and uses the hashed virtual address to index the RAM to locate a line within the RAM that provides the translation.

18 Claims, 7 Drawing Sheets

(56) References Cited

U.S. PATENT DOCUMENTS

| | | |
|---|---|---|
| 6,381,673 B1 | 4/2002 | Srinivasan et al. |
| 6,581,140 B1 * | 6/2003 | Sullivan et al. ............... 711/128 |
| 6,625,714 B1 * | 9/2003 | Lyon ............................ 711/207 |
| 6,625,715 B1 | 9/2003 | Mathews |
| 6,687,789 B1 * | 2/2004 | Keller et al. .................. 711/128 |
| 6,925,464 B2 * | 8/2005 | Kurupati ............................. 1/1 |
| 2002/0073073 A1 | 6/2002 | Cheng |
| 2003/0037055 A1 | 2/2003 | Cheng et al. |
| 2003/0074537 A1 * | 4/2003 | Pang et al. .................... 711/202 |
| 2003/0233515 A1 | 12/2003 | Honig |
| 2004/0170039 A1 | 9/2004 | MacDonald et al. |

OTHER PUBLICATIONS

Guccione, et al., paper entitled "A Reconfigurable Content Addressable Memory", Xilinx Inc., published May 18, 2000.

* cited by examiner

TRANSLATION LOOKASIDE BUFFER

CROSS-REFERENCE TO RELATED APPLICATIONS

The present patent application is a continuation of U.S. application Ser. No. 10/242,785, filed Sep. 13, 2002. The present patent application incorporates the above-identified application by reference in its entirety.

FIELD OF THE INVENTION

This invention relates to the area of translation lookaside buffers and more specifically to translation lookaside buffer architectures for rapid design cycles.

BACKGROUND OF THE INVENTION

Modern microprocessor systems typically utilize virtual addressing. Virtual addressing enables the system to effectively create a virtual memory space larger than an actual physical memory space. The process of breaking up the actual physical memory space into the virtual memory space is termed paging. Paging breaks up a linear address space of the physical memory space into fixed blocks called pages. Pages allow a large linear address space to be implemented with a smaller physical main memory plus cheap background memory. This configuration is referred to as "virtual memory." Paging allows virtual memory to be implemented by managing memory in pages that are swapped to and from the background memory. Paging offers additional advantages, including reduced main memory fragmentation, selective memory write policies for different pages, and varying memory protection schemes for different pages. The presence of a paging mechanism is typically transparent to the application program.

The size of a page is a tradeoff between flexibility and performance. A small page size allows finer control over the virtual memory system but it increases the overhead from paging activity. Therefore many CPUs support a mix of page sizes, e.g. a particular MIPS implementation supports any mix of 4 kB, 16 kB, 64 kB, 256 kB, 1 MB, 4 MB and 16 MB pages.

A processor is then able to advantageously operate in the virtual address space using virtual addresses. Frequently, however, these virtual addresses must be translated into physical addresses—actual memory locations. One way of accomplishing this translation of virtual addresses into physical addresses is a use of translation tables that are regularly accessed and stored in main memory. Translation tables are stored in main memory because they are typically large in size. Unfortunately, regularly accessing of translation tables stored in main memory tends to slow overall system performance.

Modern microprocessor systems often use a translation lookaside buffer (TLB) to store or cache recently generated virtual to physical address translations in order to avoid the need to regularly access translation tables in main memory to accomplish address translation. A TLB is a special type of cache memory. As with other types of cache memories, a TLB is typically comprised of a relatively small amount of memory storage specially designed to be quickly accessible. A TLB typically incorporates both a tag array and a data array, as are provided in cache memories. Within the tag array, each tag line stores a virtual address. This tag line is then associated with a corresponding data line in the data array in which is stored a physical address translation for the virtual address.

Thus, prior to seeking a translation of a virtual address from translation tables in main memory, a processor first refers to the TLB to determine whether the physical address translation of the virtual address is presently stored in the TLB. In the event that the virtual address and corresponding physical address are stored in the TLB, the TLB provides the corresponding physical address at an output port thereof, and a time and resource-consuming access of main memory is avoided. To facilitate operation of the TLB and to reduce indexing requirements therefore, a content addressable memory (CAM) is typically provided within the TLB. CAMs are parallel pattern matching circuits. In a matching mode of operation the CAM permits searching of all of its data in parallel to find a match.

Unfortunately, traditional TLBs require custom circuit design techniques to implement a CAM. Using custom circuit designs is not advantageous since each TLB and associated CAM requires a significant design effort in order to implement same in a processor system design. Of course, when a processor is absent CAM circuitry, signals from the processor propagate off chip to the CAM, thereby incurring delays.

It is therefore an object of this invention to provide a CAM architecture formed of traditional synthesisable circuit blocks.

SUMMARY OF THE INVENTION

In accordance with the invention there is provided a translation lookaside buffer (TLB) comprising: at least an input port for receiving a portion of a virtual address; a random access memory; a set of registers; and, synthesisable logic for determining a hash value from the received portion of the virtual address and for comparing the hash value to a stored hash value within the set of registers to determine a potential that a physical address associated with the virtual address is stored within a line within the random access memory and associated with a register, from the set of registers, within which the hash value is stored.

In accordance with an aspect of the invention there is provided a translation lookaside buffer comprising: a random access memory; a first register associated with a line in the memory; and, a hashing circuit for receiving a virtual address other than a virtual address for which a translation is presently stored in the memory, for determining a hash value and for storing the hash value in the first register; and the hashing circuit for storing the virtual address and a translation therefor in the line in memory.

In accordance with yet another aspect of the invention there is provided a translation lookaside buffer comprising: RAM; and, synthesisable logic for determining from a virtual address at least one potential address within the RAM in fixed relation to which to search for a physical address associated with the virtual address, the at least one potential address being other than the one and only known address within the RAM in fixed relation to which the physical address associated with the virtual address is stored.

In accordance with yet another aspect of the invention there is provided a method of performing a virtual address lookup function for a translation lookaside buffer including RAM and synthesisable logic including the steps of: providing a virtual address to the synthesisable logic; hashing the provided virtual address to provide a hash result;

based on the hash result determining a memory location within the RAM relative to which is stored a virtual address identifier and a physical address related thereto;

comparing the virtual address to the virtual address identifier to determine if the physical address corresponds to the provided virtual address; and, when the physical address corresponds to the provided virtual address, providing the physical address as an output value.

BRIEF DESCRIPTION OF THE DRAWINGS

The invention will now be described with reference to the drawings in which.

DETAILED DESCRIPTION OF THE INVENTION

CAM circuits include storage circuits similar in structure to SRAM circuits. However, CAM circuits also include search circuitry offering an added benefit of a parallel search mode of operation, thus enabling searching of the contents of the CAM in parallel using hardware. When searching the CAM for a particular data value, the CAM provides a match signal upon finding a match for that data value within the CAM. A main difference between CAM and SRAM is that in a CAM, data is presented to the CAM representative of a virtual address and an address relating to the data is returned, whereas in a SRAM, an address is provided to the SRAM and data stored at that address is returned.

The cells of the CAM are arranged so that each row of cells holds a memory address and that row of cells is connected by a match line to a corresponding word line of the data array to enable access of the data array in that word line when a match occurs on that match line. In a fully associative cache each row of the CAM holds the full address of a corresponding main memory location and the inputs to the CAM require the full address to be input.

Figure 1B:
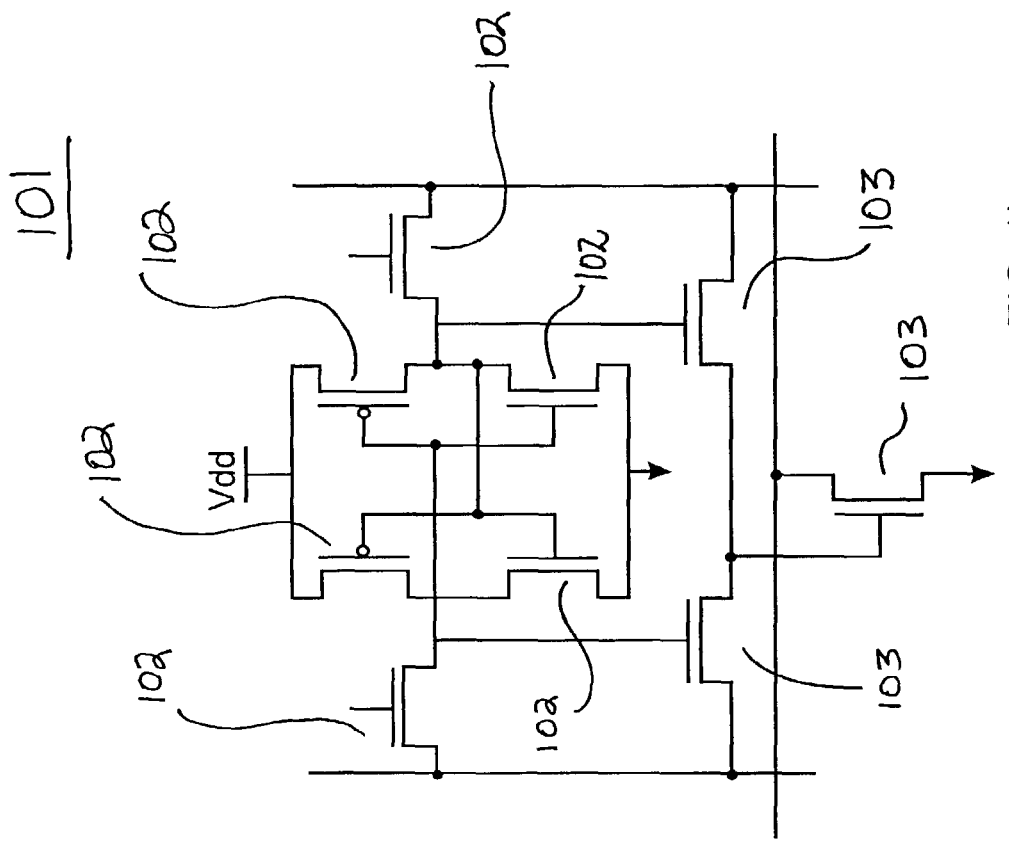
FIG. 1b illustrates a prior art transistor implementation of a CAM circuit.
Figure 1A:
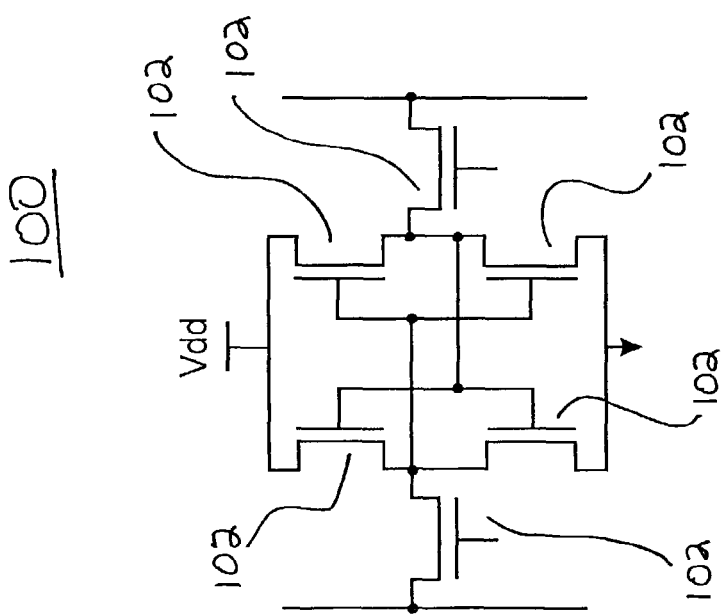
FIG. 1a illustrates a prior art transistor implementation of a SRAM circuit.

A prior art publication, entitled "A Reconfigurable Content Addressable Memory," by Steven A Guccione et al., discusses the implementation of a CAM within an FPGA. As is seen in Prior Art FIG. 1, at a transistor level, the implementation of a CAM circuit 101 is very similar to a standard SRAM 100. Both CAM and SRAM circuits are almost identical, each having 6 transistors 102 except for the addition of three match transistors 103 that provide for the parallel search capability of the CAM 101. Unfortunately, using standard programmable logic devices does not facilitate implementing such transistor level circuits.

In the prior art publication the implementation of the CAM in an FPGA is discussed. Using gate level logic to implement a CAM often results in an undesirable size of the CAM. Flip-flops are used as the data storage elements within the CAM and as a result the size of the CAM circuit attainable using an FPGA is dependent upon the number of flip-flops available within the FPGA. Implementing the CAM in an FPGA quickly depletes many of the FPGA resources and as a result is not a viable solution. Unfortunately this has lead prior designers to conclude that the CAM is only efficiently implemented at a transistor level.

The prior art publication also addresses implementing of a CAM using look up tables (LUTs) in an FPGA. Rather than using flip-flops within the FPGA to store the data to be matched, this implementation addresses the use of LUTs for storing of the data to be matched. By using LUTs rather than flip-flops a smaller CAM architecture is possible.

Unfortunately, forming CAMs from synthesisable elements is not easily done so prior art processors that offer CAM are provided with a CAM core within the processor. Providing a CAM core within the processor unfortunately makes the resulting circuit expensive because of the added design complexity. Such additional design complexity is ill-suited for small batch custom design processors.

Figure 2:
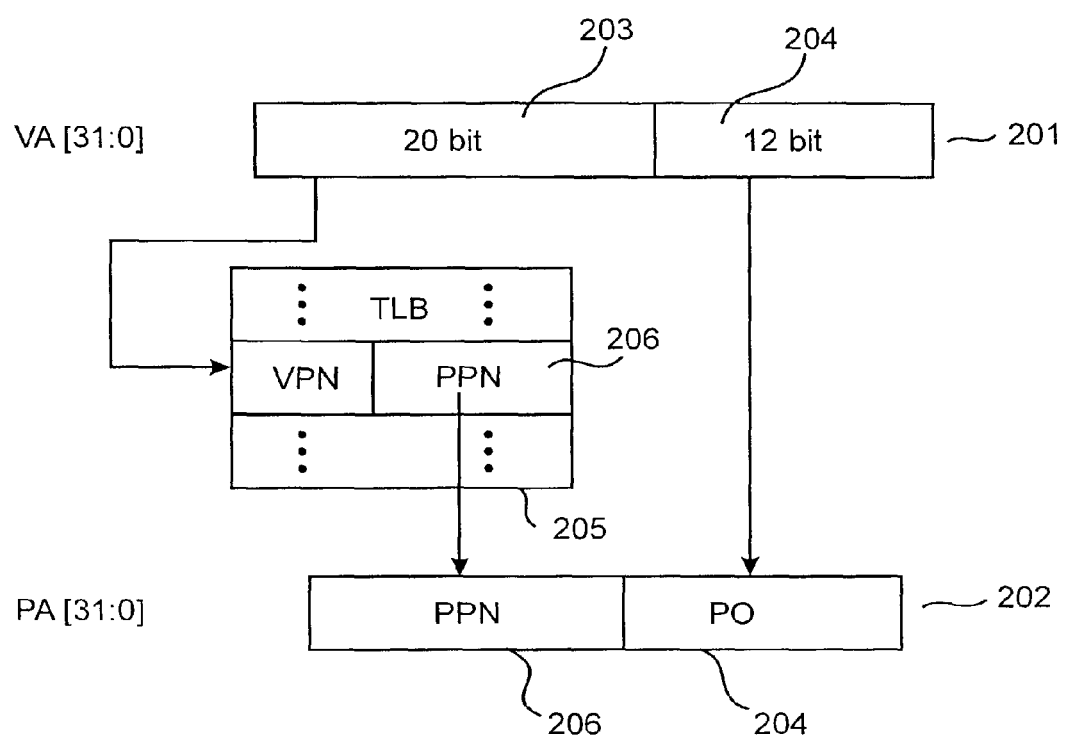
FIG. 2 illustrates a prior art translation process from a virtual address (VA) to a physical address (PA)

FIG. 2 illustrates the translation process from a virtual address (VA) 201 to a physical address (PA) 202. The VA 201 is a 32-bit address, VA[31:0], and the PA 202 is also a 32-bit address PA[31:0]. The VA has two portions, a virtual page number (VPN) 203 and a page offset (PO) 204. The VPN 203 is typically located in the upper portion of the VA 201 and the PA 202 is typically located in the lower portion, though this need not be so. Typically for a 32-bit addressing scheme, the VPN is 20 bits and the PA is 12 bits. The PA, or lower 12 bits translate directly into the PA. The VPN 203 is used for indexing the TLB 205 to retrieve a physical page number (PPN) 206 therefrom. In other words, the VPN 203 undergoes translation to the PPN 206. Combining the PPN 206 in the upper portion of the PA 202 and the PO into the lower portion of the PA provides a translation from the VA to the PA.

Figure 3:
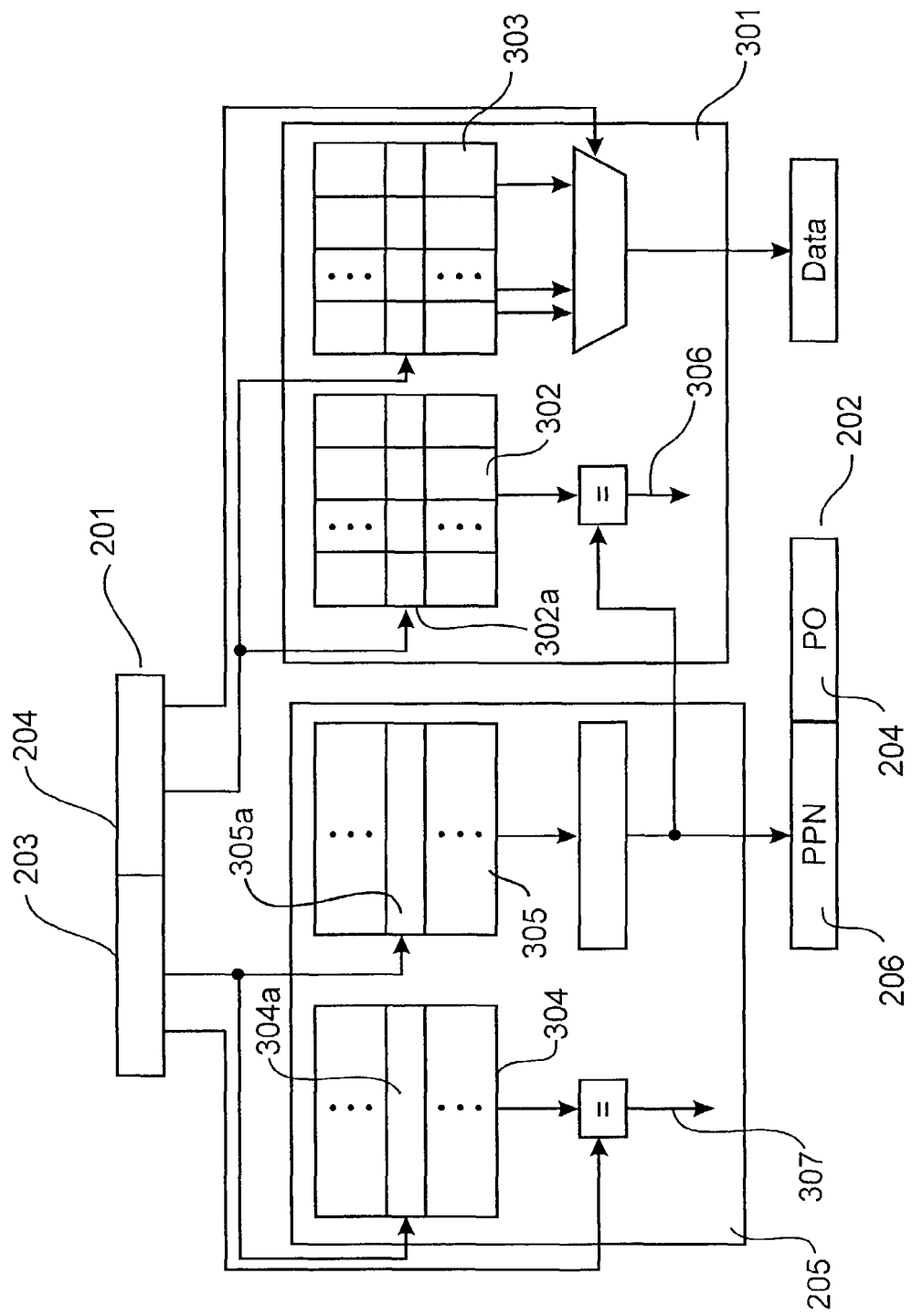
FIG. 3 illustrates a prior art translation from a VA to a PA when performed in conjunction with a direct mapped cache memory.

FIG. 3 illustrates the translation from a VA 201 to a PA 202 when performed in conjunction with a direct mapped cache memory 301. At the beginning of a translation cycle, the VA is used to access both the cache memory 301 and the TLB 205. The page-offset portion of the VA is used to access the cache memory 301—the page offset being the portion of the address that remains unmodified by the translation process. The page offset is used to index a tag array 302 and a data array 303 found in cache memory 301 where the page offset is used to index a cache line 302a within the cache memory 301. Access to the TLB 205 is performed using the VPN 203 portion of the VA 201. The TLB 205 typically comprises a TLB tag array 304 and a TLB data array 305. Both the TLB tag array 304 and the TLB data array 305 contain bits from the VPN 203 such that when a VPN is provided to both of these arrays, the bits making up the VPN are compared to those stored within the arrays 304, 305 to locate an entry within the TLB 205.

Once the TLB data array 305 is accessed and a match is found between the VPN and an entry within the TLB data array 305a, the PPN 206 is retrieved and is provided to the cache memory 301 and used for comparison to the tag retrieved 302a from the tag array 302. A match being indicative of a cache "hit" 306. If a match is found between the VPN 203 and an entry within the TLB tag array 304a then a TLB hit signal 307 is generated. In this manner, the cache is only accessed using bits of the PPN 206. The above example illustrates the use of a direct mapped cache memory; however, the same translation of a VA to a PA is applicable to set-associative caches as well. When set-associative caches are used, those of skill in the art appreciate that the size of a cache way is less than or equal to the size of a virtual page.

Unfortunately, when a TLB is implemented in SRAM, an exhaustive search of the memory is required to support CAM functionality. Thus, when a TLB has storage for 1024 virtual addresses and their corresponding Physical Address, each address translation requires up to 1024 memory access and comparison operations. Such a CAM implementation is unworkable as the performance drops linearly with CAM size.

Figure 4A:
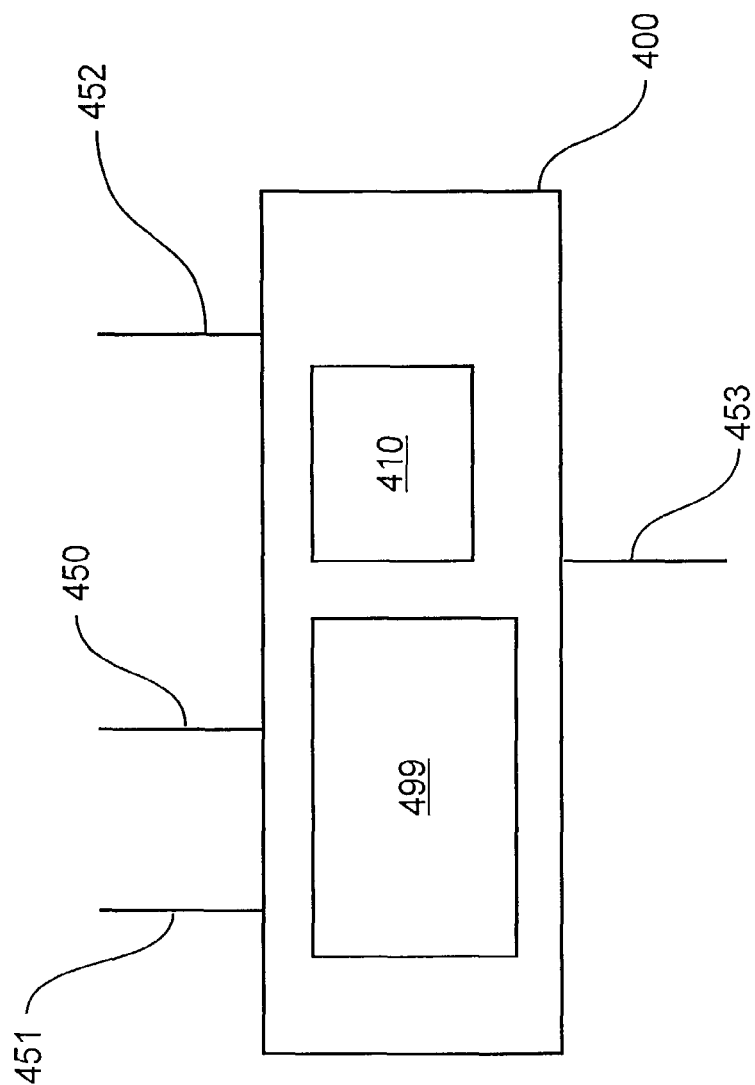
FIG. 4a generally illustrates a translation lookaside buffer formed using synthesisable logic components and a random access memory.

FIG. 4a generally illustrates a TLB 400 formed using synthesisable logic components 499 and a random access memory (RAM) 410. A VPN for translation is provided via a VPN_IN input port 450, where bits VPN_IN[31:12] are provided from the VA[31:0] to this input port 450. A page mask signal is provided via a CP0_PAGE_MASK input port 451. A CP0_TRANSLATION input signal is provided via a CP0_TRANSLATION input port 452. A TLB_TRANSLATION output signal is provided via TLB_TRANSLATION output port 453, in dependence upon a translation from a VA to a PA using the TLB 400.

Figure 4B:
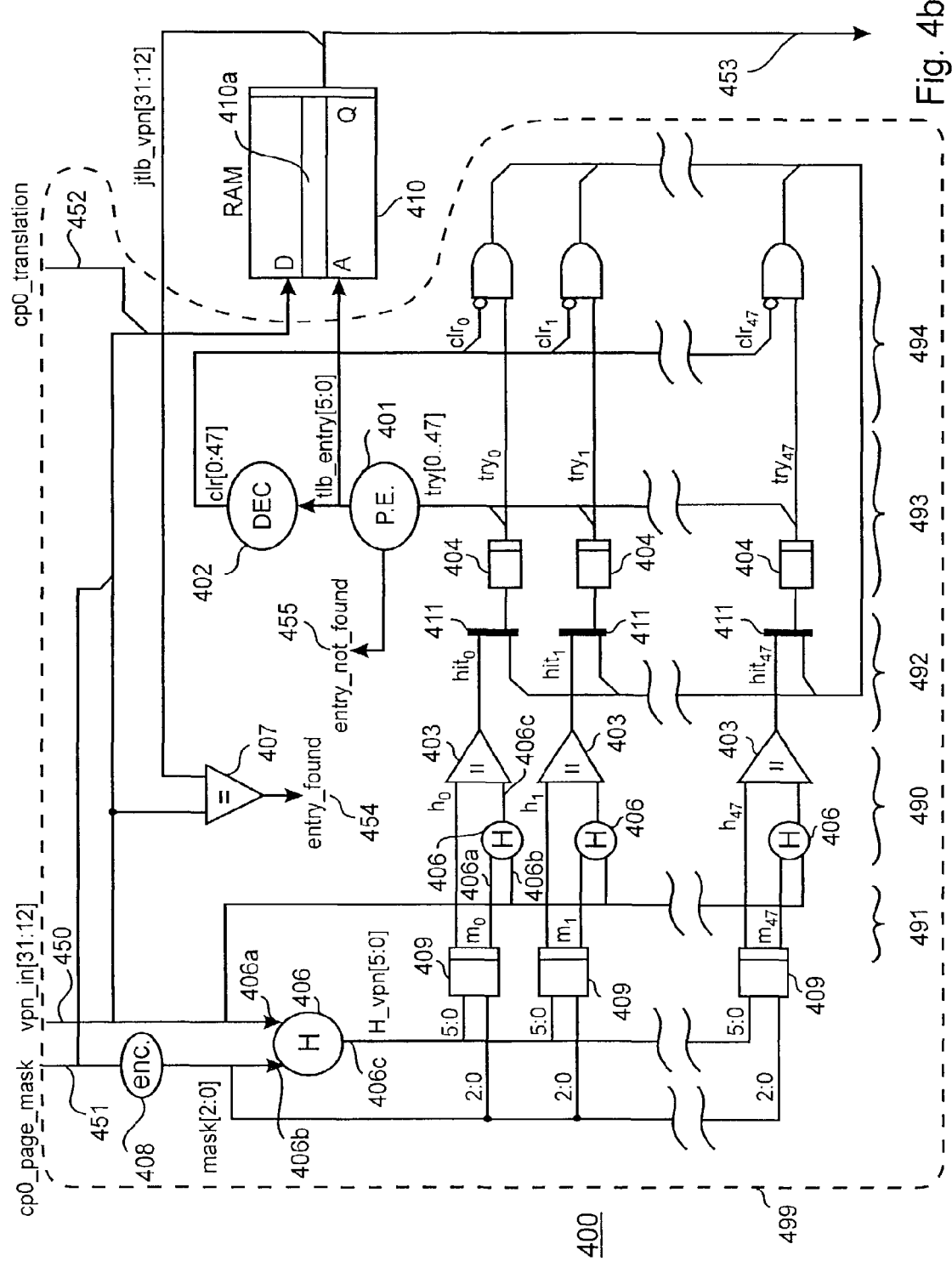
FIG. 4b illustrates a translation lookaside buffer in more detail formed from synthesisable logic components.
Figure 4C:
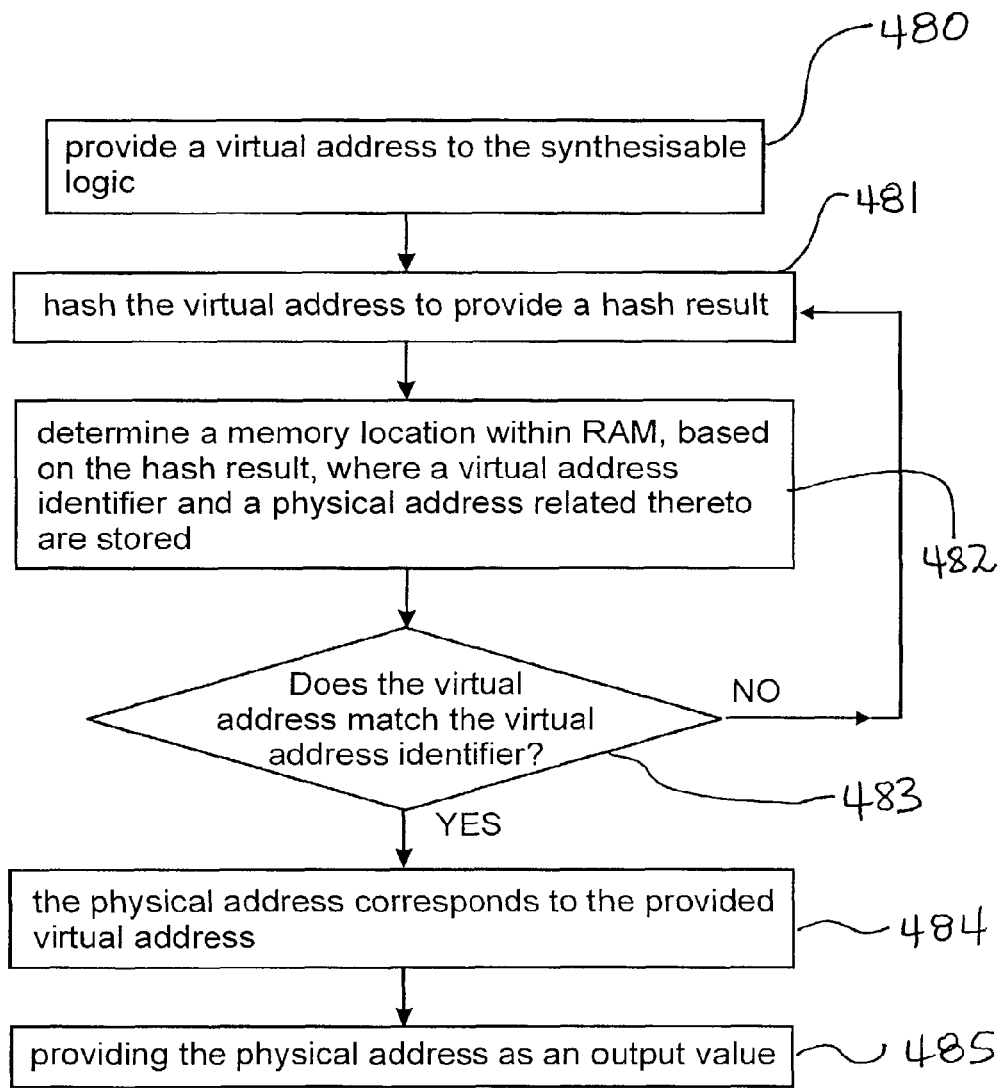
FIG. 4c outlines the steps taken for operation of the TLB.

FIG. 4b illustrates a TLB 400 in more detail formed from synthesizeable logic components, and in FIG. 4c the steps of operation for the TLB 400 are shown in summary. In more detailed description of the TLB operation, a VPN for translation is provided 480 via a VPN_IN input port 450, where bits VPN_IN[31:12] are provided from the VA[31:0] to this input port 450 as the VPN. A page mask is provided via a CP0_PAGE_MASK input port 451. This page mask is provided to a page mask encoder 408, for encoding the page mask according to Table 1.

TABLE 1

Page Mask Encoding

| page size | mask[2:0] |
|---|---|
| 4 kB | 0 0 0 |
| 16 kB | 0 0 1 |
| 64 kB | 0 1 0 |
| 256 kB | 0 1 1 |
| 1 M | 1 0 0 |
| 4 M | 1 0 1 |
| 16 M | 1 1 0 |

The page mask encoder 408 is used for accepting the CP0_PAGE_MASK input signal on an input port thereof and for correlating this input signal to a 3-bit vector, MASK[2:0]. The 3-bit vector MASK[2:0] is further provided to a hashing circuit 406. The hashing circuit 406 receives VPN_IN[31:12] via a first input port 406a and MASK[2:0] via a second input port 406b. A hashed vector H_VPN[5:0] is provided from an output port 406c thereof via a hashing operation 481 of the hashing circuit 406. The hashed vector H_VPN[5:0] and the MASK[2:0] are further provided to each one of 48 registers 409, where each register consists of multiple flip-flops collectively referred to as 491. Each of the registers 409 has two output ports. A first output signal from a first output port thereof is provided to a comparator circuit 403. A second output signal from a second output port is provided to the second input port 406b on one of 48 hashing circuits 406. The first input port on this hashing circuit receives VPN_IN[31:12]. The hashing circuit 406 output port is coupled to one of 48 comparator circuits 403 for performing a comparison between the register output and the hashing circuit output signal. Each of the comparators, in dependence upon a comparison of two input signals, provides a '1' if the signals are the same and a '0' if they are different. Output signals hit, from each of the 48 comparators is provided to one of 48 single bit 2-input multiplexers 411. Outputs ports from each of the multiplexers are coupled to a flip-flop 404. Each of the flip-flop 404 generates an output signal provided at the output ports labeled $try_i$, where collectively these output signals $try[0 \ldots 47]$, for $0 \leq i \leq 47$ are provided to a priority encoder circuit 401. The priority encoder circuit is further coupled to a binary decoder circuit 402, where the priority encoder circuit asserts a TLB_ENTRY[5:0] signal to the binary decoder circuit 402 and to the RAM 410. Three output ports are provided within the TLB 400, an ENTRY_FOUND output port 454, an ENTRY_NOT_FOUND output port 455 and a TLB_TRANSLATION output port 453, for providing ENTRY_FOUND, ENTRY_NOT_FOUND, and TLB_TRANSLATION output signal, respectively.

An address for translation from a VA to a PA is stored in a random access memory (RAM) 410, with the RAM 410 preferably having 48-entries, in the form of lines. In use, whenever a new translation is to be performed, input signals VPN_IN, CP0_PAGE_MASK, and CP0_TRANSLATION are provided to the TLB circuit 400 via input ports 450, 451, and 452, respectively. Translations performed by the TLB are stored in RAM 410 for a given index, i. The given index, indexes one of the lines 410a within the RAM that holds the translation to the PPN. The hashing circuit 406 computes the hash function H (VPN_IN, MASK) and stores the result in a corresponding 6-bit register $h_i$ 490. The page mask is stored in the 3-bit register $m_i$ 491.

When a translation is requested using the TLB, a VPN is provided via the input port 450 and the hash functions H (VPN_IN, $m_i$) is computed for all i and compared to $h_i$. This yields a 48 bit vector 492 $hit_0 \ldots hit_{47}$ which is subsequently loaded into a 48 bit register 493 $try_0 \ldots try_{47}$. In order to determine whether the requested VPN_IN is present in the translation table stored in RAM 482, only those entries, or lines, in RAM are checked for which $try_i$ is asserted. An entry in the 48-bit $try_i$ vector is asserted if it yields a '1' 483. Of course, there may be more than one bit asserted in the $try_i$ vector, but the priority encoder 401 selects the entry with the lowest index to address entries within the RAM. The decoder 402 converts this index to a 48-bit one-hot vector 494 $clr_0 \ldots clr_{47}$. When the clock pulse arrives from a clock circuit (not shown), the $try_i$ vector is reloaded, except for a bit corresponding to an index just used to address the RAM, which is cleared. This process is repeated, one entry at a time 483. The process stops as soon as the requested entry is found 484, as indicated by the ENTRY_FOUND signal on the ENTRY_FOUND output port 454, or when all bits in $try_i$ are 0. When all bits in $try_i$ are '0' then the ENTRY_NOT_FOUND signal is provided via the ENTRY_NOT_FOUND output port 455. In the first case the translation is successful and information for the translation is provided 485 from the RAM 410 using a TLB_TRANSLATION signal on the TLB_TRANSLATION output port 453. In the second case the translation is not successful and the TLB reports a TLB refill exception.

Figure 5:
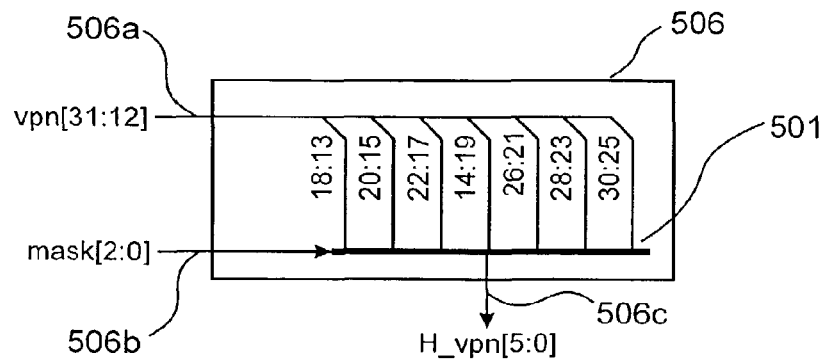
FIG. 5 illustrates a hashing circuit in more detail.
Figure 6:
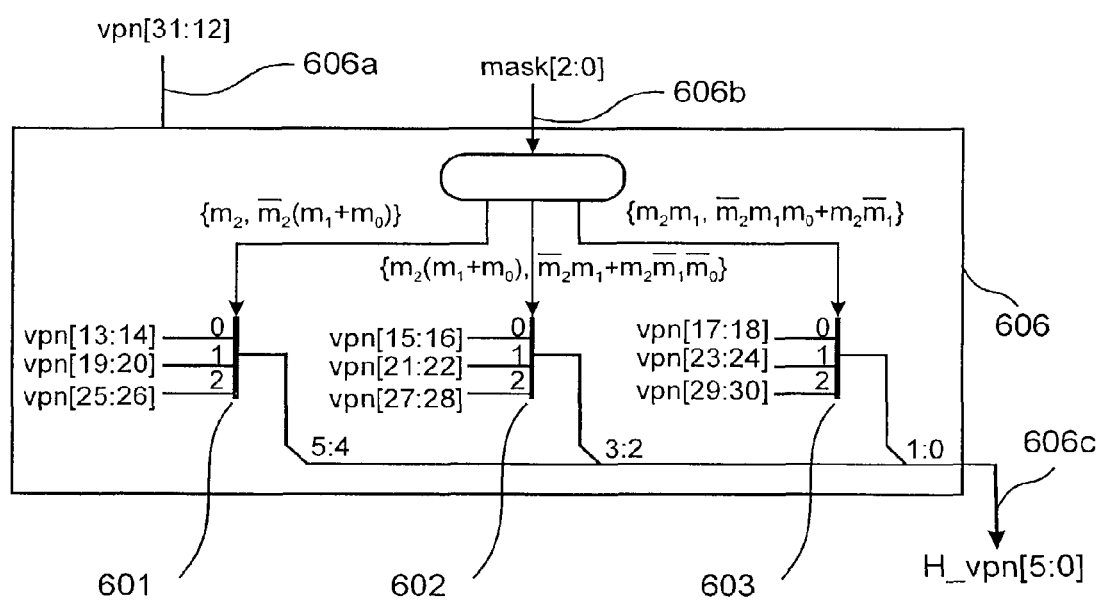
FIG. 6 illustrates a variation of the hashing circuit shown in FIG. 5.

FIG. 5 illustrates a hashing circuit 506 in more detail. Using the MASK[2:0] and VPN[31:12] input signals to the hashing circuit 506, a 7 to 1 multiplexer 501 provides the H_VPN[5:0] output signal from the hashing circuit 506 in dependence upon the MASK[2:0] signal provided to the second input port 506b. This hashing circuit selects the 6 least significant bits from the VPN. The selection is controlled by the page mask because the definition of "least significant" changes with the page size. For example, with a 4 kB page size, the 6 least significant bits (LSB)s of the VPN are bits 22:17, but with a 16 kB page size the 6 LSBs are bits 19:14. Since the TLB 400 stores two adjacent virtual pages per TLB entry, called an odd/even pair, the 6 LSBs for a 4 kB page odd/even pair are bits 18:13. Thus bit 12 decides whether to return the even (0) or odd (1) translation, and for a 16 kB odd/even pair the bits are 20:15. This hash function, however, is redundant, since the ordering of bits H_VPN[5:0] is irrelevant. FIG. 6 exploits the fact that ordering of bits is irrelevant.

FIG. 6 illustrates a variation of the hashing circuit shown in FIG. 5. A VPN[31:12] signal is provided to the first input port 606a, and a MASK[2:0] signal is provided to the second input port 606b. The mask signal MASK[2:0] is comprised of bits m0, m1, and m2. Within this hashing 606 circuit there are 3, 3 to 1 multiplexers 601 through 603. The first multiplexer 601 receives the following hits, $\{m_2, \overline{m}_2(m_1+m_0)\}$ on its selection input ports, where bits from the VPN, VPN[13:14], VPN[19:20], VPN[25:26] are provided to multiplexer data input ports, 0 through 2, respectively. Multiplexer 601 thus provides bits 5 and 4 to the H_VPN[5:0] output signal. The second multiplexer 602 receives the following bits $\{m_2(m_1+m_0), \overline{m}_2m_1+m_2\overline{m_1m_0})\}$ on its selection input ports, where bits from the VPN, VPN[15:16], VPN[21:22], VPN[27:28] are provided to multiplexer data input ports, labeled 0 through 2, respectively. Multiplexer 602 thus provides bits 3 and 2 to the H_VPN[5:0] output signal. The third multiplexer 603 receives the following bits $\{m_2m_1, \overline{m}_2m_1m_0+m_2\overline{m_1}\}$ on its selection input ports, where bits from the VPN, VPN[17:18], VPN[23:24], VPN[29:30] are provided to multiplexer data input ports, labeled 0 through 2, respectively. Multiplexer 603 thus provides bits 1 and 0 to the H_VPN[5:0] output signal.

Preferably, the hash function H_VPN[5:0] is uniformly distributed for MASK[2:0] and for VPN_IN[31:12] input signals. In the case of a TLB miss, all entries within the RAM are looked up for which $try_1$ is initially asserted. The number of cycles $N_{miss}$ is given by the following equation:

$$N_{miss} = \sum_{j=0}^{48} \binom{48}{j} p^j (1-p)^{48-j} (1+j)$$

where p is the probability that a comparator output signal hit, is asserted. The term:

$$\binom{48}{j} p^j (1-p)^{48-j}$$

gives the probability that exactly j bits in the try vector $try_i$ are initially asserted. Having a uniform hashing function H with n bits at the output signal thereof, $p=2^{-n}$, wherein the case of FIG. 4b, n=6.

In the case of a TLB hit, at least one access to the RAM 410 us required, as opposed to a TLB miss condition which is detected without accessing the RAM, since in a TLB miss condition the try vector $try_1$ contains all zeros.

The average number of cycles to perform a translation that hits in the TLB is given by the following formula:

$$N_{hit} = \sum_{k=0}^{47} \binom{47}{k} p^k (1-p)^{47-k} \left(1+\frac{k}{2}\right)$$

For a TLB hit, there must be at least one '1' in the try vector $try_1$. The only uncertainty is with the remaining elements within the vector. The variable k is used to represent the number of remaining entries that are set to '1' within the try vector $try_1$ for k in the range from 0 ... 47. If k=0 then only one entry within the RAM is looked up. Therefore, since one clock cycle was used to find the translation in the first location for i=0, then a total of two clock cycles are utilized to perform the translation. On average, it takes 2+k/2 cycles to return the requested translation from RAM 410.

In terms of performing the translation and interrupt latency, the number of clock cycles required is examined for long lookup sequences, for instance having a k as high as 25 or more. The following relation:

$$P\{N_{25}\} + \sum_{25}^{48} \binom{48}{j} p^j (1-p)^{48-j}$$

gives the probability that the TLB will use 25 or more cycles to complete a translation. Table 2 lists, for a range of hash function widths (n), the average number of cycles it takes to find a translation $N_{hit}$, to detect a miss $N_{miss}$ and the probability that the TLB operation takes 25 cycles or more.

TABLE 2

TLB latency as a function of the number of hash bits 'n'

| n | $N_{hit}$ | $N_{hitq}$ | $N_{miss}$ | $P\{N_{25}\}$ |
|---|---|---|---|---|
| 3 | 4.94 | 3.94 | 7.00 | $4.3 \cdot 10^{-11}$ |
| 4 | 3.46 | 2.46 | 4.00 | $5.9 \cdot 10^{-18}$ |
| 5 | 2.73 | 1.73 | 2.50 | $3.6 \cdot 10^{-25}$ |
| 6 | 2.37 | 1.37 | 1.75 | $1.5 \cdot 10^{-32}$ |
| 7 | 2.18 | 1.18 | 1.38 | $5.4 \cdot 10^{-40}$ |

From Table 2 it is evident that P $\{N_{25}\}$ is so small that even with a 4 bit hash function it takes more than 6000 years of continuous operation to run into a case where the TLB translation requires between 25 and 48 clock cycles.

The column $N_{hitq}$ ("hit quick") applies to the case where the VPN_IN is applied continuously to the TLB circuit 400. From this table it is evident that having n=5 or n=6 is sufficient when focusing on the most important number, which is $N_{hit}$. There is not much to be gained beyond 6 bits, since $N_{hit}$ approaches 2.0 when n=>20. A value of n=6 is used in the TLB circuit 400 since the hash function may not be very uniform. Therefore, 6-bit hash function used within the TLB approximates the performance of a 5-bit truly uniform hash function.

Advantageously, when VA is provided to the TLB it is propagated to the synthesized logic for each line and a result is provided indicated by at least an asserted bit within the $try_1$ vector of bits. Only those lines for which a result indicative of a match occurred are then physically accessed to provide the PPN As such only a small fraction of the TLB lines are accessed for the translation process, thus resulting in a substantial performance improvement.

Numerous other embodiments may be envisaged without departing from the spirit or scope of the invention.

What is claimed is:

1. A method, comprising:
generating, using a virtual address, a try vector comprising a plurality of bits, wherein each bit of the try vector corresponds to a respective different line in a memory and its status indicates whether its respective line potentially stores a translation for the virtual address;
accessing a line of the memory based on the respective bit of the try vector indicating that the line potentially stores the translation for the virtual address; and
determining whether the accessed line includes the translation for the virtual address;

wherein said generating a try vector comprises setting more than one bit of the try vector at a time to indicate that more than one line of the memory potentially stores the translation for the virtual address.

2. The method of claim 1, further comprising:
generating an index for a line of the memory based on the try vector;
using the index to access the line of the memory; and
outputting a physical page number for the virtual address in response to the accessed line including the translation for the virtual address.

3. The method of claim 1, wherein said determining comprises determining that the accessed line includes the translation for the virtual address in response to the accessed line including a virtual page number for the virtual address.

4. The method of claim 1, further comprising:
generating an index for a line of the memory based on the try vector;
using the index to access the line of the memory;
updating the try vector to indicate the accessed line of the memory does not include the translation for the virtual address; and
accessing another line of the memory based on the updated try vector.

5. The method of claim 1, further comprising:
generating an index for a line of the memory based on the try vector;
using the index to access the line of the memory;
updating the try vector to indicate that the accessed line of the memory does not include the translation for the virtual address; and
signaling that the memory does not include the translation for the virtual address in response to the try vector indicating that no line potentially stores the translation for the virtual address.

6. The method of claim 1, further comprising:
accessing a line of the memory corresponding to a set bit of the try vector; and
clearing the set bit of the try vector corresponding to the line of the memory in response to determining that the corresponding line does not include the translation for the virtual address.

7. The method of claim 6, further comprising signaling that the memory does not include the translation for the virtual address in response to all bits of the try vector being cleared.

8. An apparatus, comprising:
a memory including a plurality of lines;
a register configured to store a try vector that indicates which, if any, lines in the memory potentially store a translation for a virtual address, wherein each bit of the try vector corresponds to a respective different line in the memory and its status indicates whether its respective line potentially stores the translation for the virtual address;
an encoder configured to generate an index based on the try vector and access a line of the memory using the index;
a comparator configured to indicate whether the accessed line of the memory includes the translation for the virtual address; and
an output port configured to output the translation for the virtual address;
wherein set bits of the try vector indicate that corresponding lines of the memory potentially store the translation for the virtual address; and
wherein the try vector is configured to set more than one bit at a time to indicate more than one line potentially stores the translation for the virtual address.

9. The apparatus of claim 8, wherein the output port is further configured to output a physical page number stored in the accessed line.

10. The apparatus of claim 8, wherein said comparator is configured to indicate that the accessed line includes the translation for the virtual address in response to determining that a virtual page number stored in the accessed line matches a virtual page number of the virtual address.

11. The apparatus of claim 8, further comprising:
a decoder configured to receive the index and to specify a bit of the try vector to update to a status that indicates the accessed line of the memory does not include the translation for the virtual address;
wherein the encoder is further configured to generate another index based on the updated try vector and access another line of the memory using the other index.

12. The apparatus of claim 8, further comprising:
a decoder configured to receive the index and to specify a bit of the try vector to update to a status that indicates the accessed line of the memory does not include the translation for the virtual address; and
wherein the encoder is further configured to signal that the memory does not include the translation for the virtual address in response to the try vector indicating that no line potentially stores the translation for the virtual address.

13. The apparatus of claim 8, wherein:
the encoder is further configured to select a set bit of the try vector and to generate the index for a line of the memory that corresponds to the selected bit; and
the apparatus further comprises a decoder configured to receive the index and to specify that the set bit of the try vector corresponding to the line is to be cleared if the accessed line of the memory does not include the translation for the virtual address.

14. The apparatus of claim 8, wherein the encoder is further configured to signal that memory does not include the translation for the virtual address in response to all bits of the try vector being cleared.

15. An apparatus, comprising:
a memory including a plurality of lines;
means for activating bits of a try vector that comprises a plurality of bits, wherein each bit of the try vector corresponds to a respective line of the memory and each activated bit indicates its respective line in the memory potentially stores a translation for a virtual address;
means for accessing a line of the memory based on the activated bits of the try vector; and
means for determining whether the accessed line includes the translation for the virtual address;
wherein set bits of the try vector indicate that corresponding lines of the memory potentially store the translation for the virtual address; and
wherein the try vector is configured to set more than one bit at a time to indicate more than one line potentially stores the translation for the virtual address.

16. The apparatus of claim 15, further comprising:
means for generating an index for a line of the memory based on the try vector;
means for using the index to access the line of the memory; and
means for outputting a physical page number for the virtual address in response the accessed line including the translation for the virtual address.

17. The apparatus of claim 15, further comprising:
means for generating an index for a line of the memory based on the try vector;

means for using the index to access the line of the memory;
means for deactivating the activated bit of the try vector corresponding to the accessed line in response to the accessed line not including the translation for the virtual address; and
means for accessing another line of the memory based on the try vector.

18. The apparatus of claim 15, further comprising:
means for generating an index for a line of the memory based on the try vector;
means for using the index to access the line of the memory;
means for deactivating the activated bit of the try vector corresponding to the accessed line in response to the accessed line not including the translation for the virtual address; and
means for signaling that the memory does not include the translation for the virtual address in response to all bits of the try vector being deactivated.

* * * * *

UNITED STATES PATENT AND TRADEMARK OFFICE
CERTIFICATE OF CORRECTION

PATENT NO. : 8,607,026 B2  
APPLICATION NO. : 13/298800  
DATED : December 10, 2013  
INVENTOR(S) : Stravers et al.

Page 1 of 1

It is certified that error appears in the above-identified patent and that said Letters Patent is hereby corrected as shown below:

In the Specification

In Column 4, Line 19, delete "VΛ 201" and insert -- VA 201 --, therefor.

In Column 5, Line 18, delete "synthesizeable" and insert -- synthesizable --, therefor.

In Column 5, Line 41, delete "CPO_PAGE_MASK" and insert -- CP0_PAGE_MASK --, therefor.

In Column 7, Line 7, delete "hits" and insert -- bits --, therefor.

In Column 7, Line 10, delete "hits," and insert -- bits, --, therefor.

In Column 7, Line 34, after Equation, insert -- , --.

In Column 7, Line 42, after Equation, insert -- , --.

In Column 7, Line 50, delete "us" and insert -- is --, therefor.

In Column 8, Line 12, after Equation, insert -- , --.

Signed and Sealed this  
Thirteenth Day of May, 2014

Michelle K. Lee  
*Deputy Director of the United States Patent and Trademark Office*